United States Patent
Prevost

(10) Patent No.: US 7,677,833 B2
(45) Date of Patent: Mar. 16, 2010

(54) SAFETY IMPROVEMENTS FOR AIRPORT RUNWAYS AND TAXIWAYS

(75) Inventor: Jean Prevost, Westmount (CA)

(73) Assignee: Fieldturf Tarkett Inc., Quebec (CA)

(*) Notice: Subject to any disclaimer, the term of this patent is extended or adjusted under 35 U.S.C. 154(b) by 0 days.

(21) Appl. No.: 11/787,481

(22) Filed: Apr. 17, 2007

(65) Prior Publication Data

US 2008/0175665 A1 Jul. 24, 2008

Related U.S. Application Data

(62) Division of application No. 10/406,813, filed on Apr. 3, 2003, now Pat. No. 7,207,742.

(60) Provisional application No. 60/369,334, filed on Apr. 3, 2002.

(51) Int. Cl.
B64F 1/36 (2006.01)

(52) U.S. Cl. .................. 404/71; 405/302.7; 244/114 R

(58) Field of Classification Search .................. 404/17, 404/18, 31, 32, 71; 244/114 B, 114 R; 405/129.75, 405/302.4, 302.7
See application file for complete search history.

(56) References Cited

U.S. PATENT DOCUMENTS

| | | |
|---|---|---|
| 3,066,896 A | 12/1962 | Schirtzinger |
| 3,932,051 A | 1/1976 | Cleary |
| 4,362,780 A | 12/1982 | Marzocchi et al. |
| 4,442,148 A | 4/1984 | Stierli |
| 4,896,453 A | 1/1990 | Jacob |
| 5,013,029 A | 5/1991 | Vaux |
| 5,090,154 A | 2/1992 | Jacob |
| 5,131,787 A | 7/1992 | Goldberg |
| 5,509,231 A | 4/1996 | Marcoux |
| 5,564,864 A | 10/1996 | Simpson et al. |
| 5,607,742 A | 3/1997 | Ing et al. |
| 5,863,147 A | 1/1999 | Pressler |
| 6,361,245 B1 | 3/2002 | Polivka |
| 6,620,482 B2 | 9/2003 | Carr et al. |
| 6,666,617 B1 * | 12/2003 | Polivka, Jr. .................. 404/36 |
| 6,794,007 B2 | 9/2004 | Carr et al. |
| 7,175,362 B2 * | 2/2007 | Carr et al. .................... 404/17 |
| 7,207,742 B2 | 4/2007 | Prevost |
| 7,207,743 B2 * | 4/2007 | Polivka, Jr. .................. 404/73 |
| 7,223,047 B2 | 5/2007 | Prevost |
| 7,249,913 B2 * | 7/2007 | Linville ....................... 404/73 |
| 2003/0215287 A1 | 11/2003 | Prevost |
| 2006/0088380 A1 | 4/2006 | Prevost |

FOREIGN PATENT DOCUMENTS

WO    WO 02/20903 A1    3/2002

OTHER PUBLICATIONS

Soil Stabilization Products Company, Inc. "Airfield Shoulder Stabilization," Soil Stabilization Products Co., Inc., 2002, 1 page.

* cited by examiner

*Primary Examiner*—Gary S Hartmann
(74) *Attorney, Agent, or Firm*—Factor & Lake, Ltd.

(57) ABSTRACT

An airstrip shoulder-bordering surface arrangement for extending the width of existing runway and taxiway shoulders comprising a flexible water-impermeable surfacing material extending laterally of a side edge of an airstrip shoulder, an artificial grass surface adjacent the water-impermeable surfacing material, and an edge-fastening system for securing the surfacing material in position relative to the airstrip shoulder to prevent water migration therebetween, the surfacing material having a relatively smooth top surface.

18 Claims, 3 Drawing Sheets

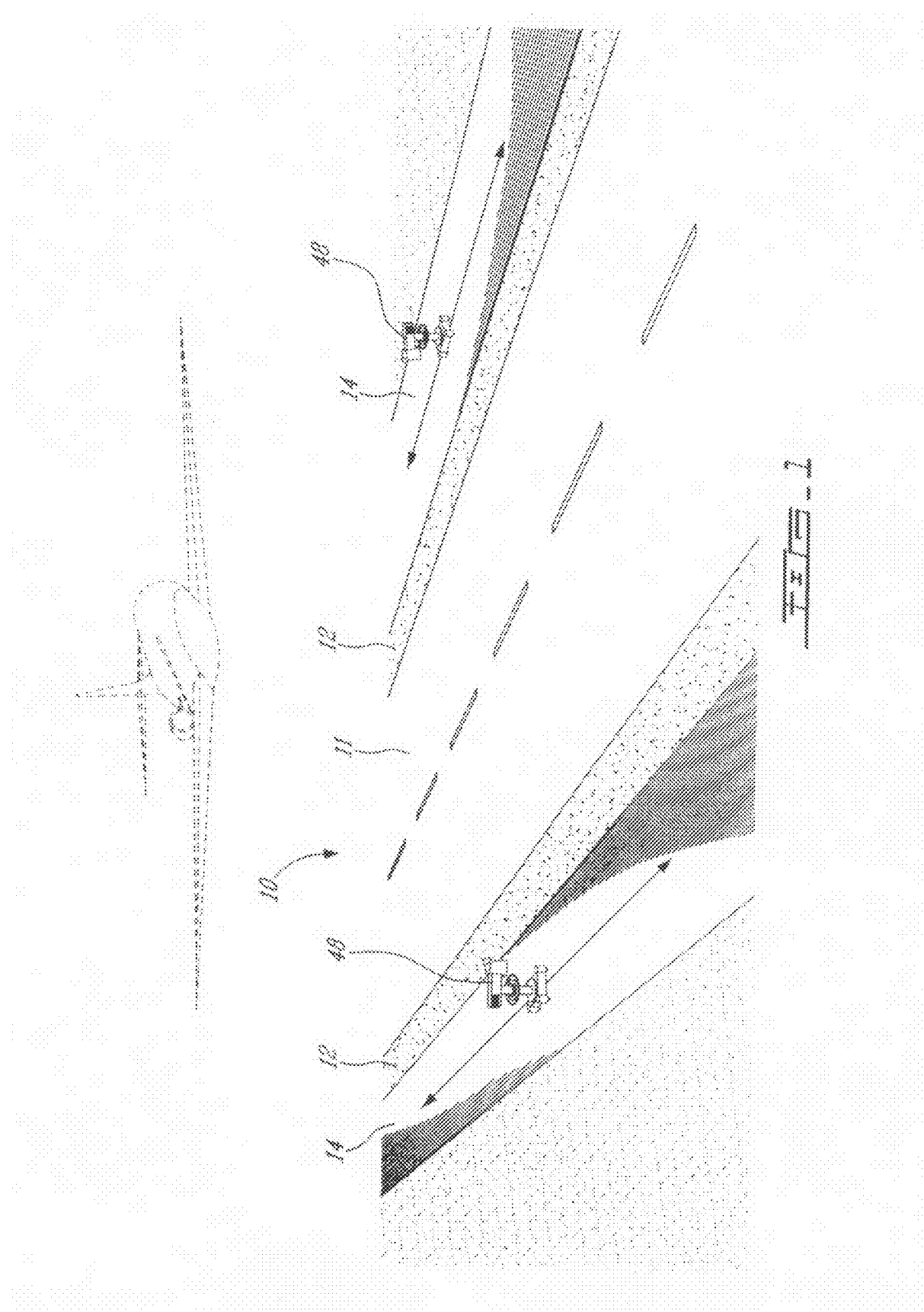

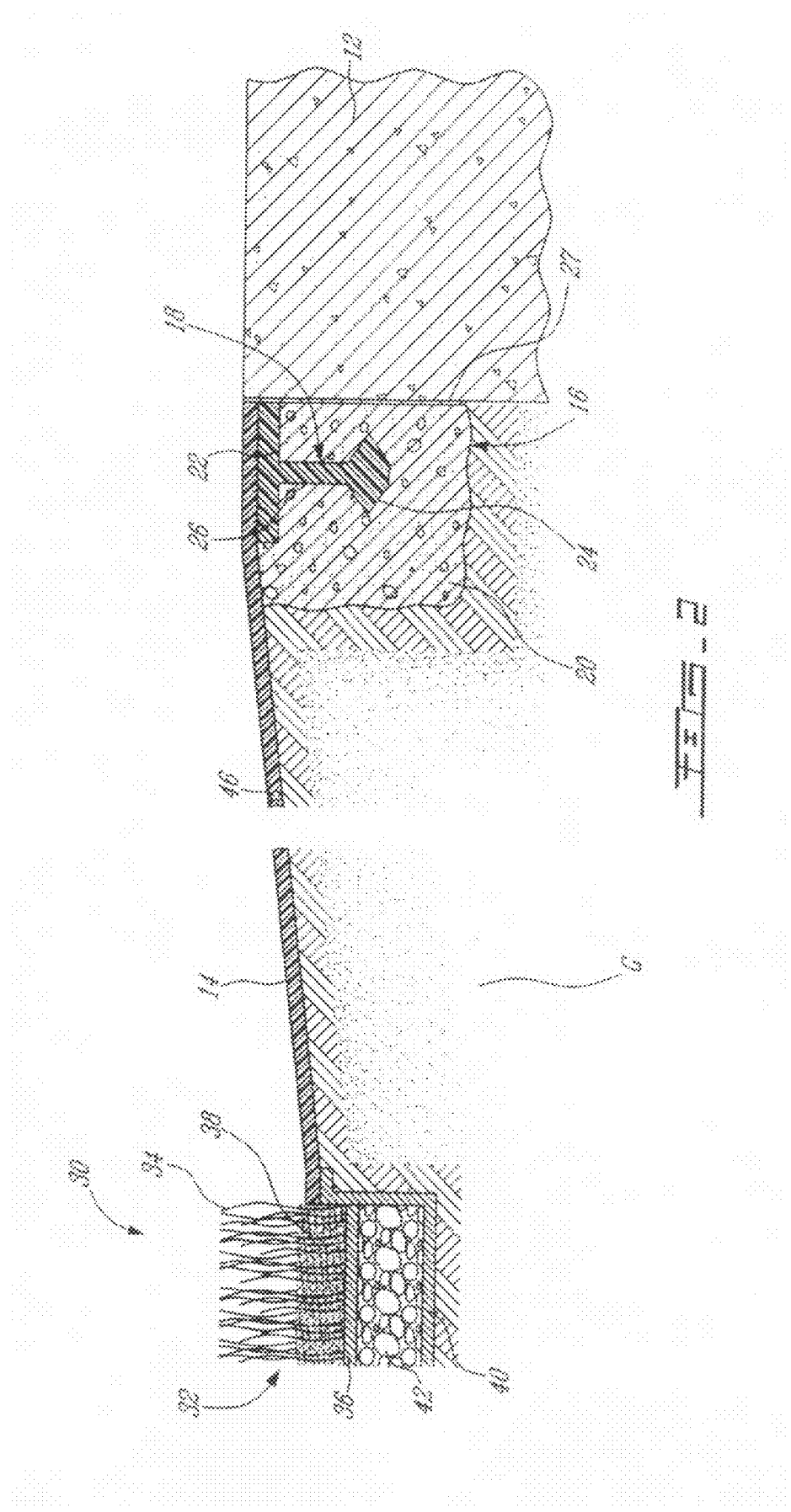

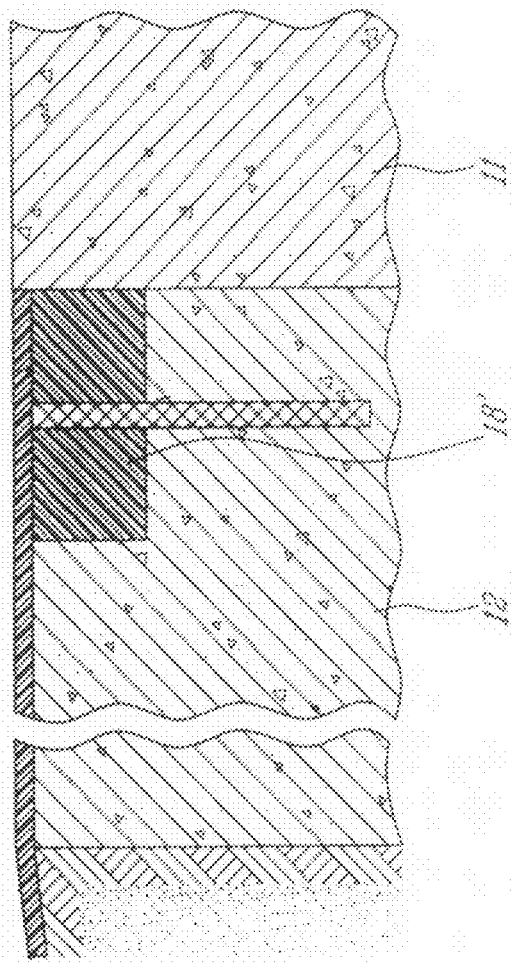
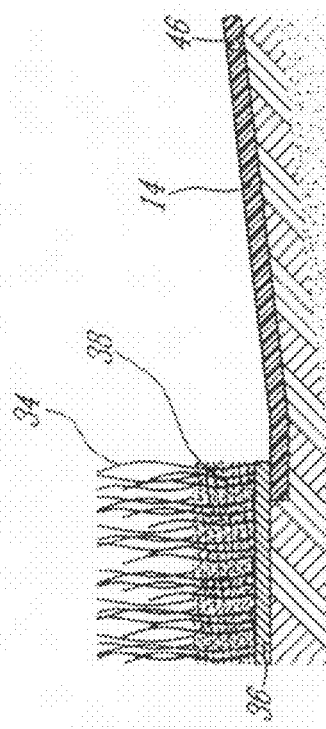

SAFETY IMPROVEMENTS FOR AIRPORT RUNWAYS AND TAXIWAYS

RELATED APPLICATIONS

This application is a divisional application of U.S. application Ser. No. 10/406,813 filed on Apr. 3, 2003, now patented as U.S. Pat. No. 7,207,742, issued on Apr. 24, 2007, which claims priority to Provisional Application No. 60/369,334 filed on Apr. 3, 2002. In addition, this application is related to U.S. Pat. No. 7,223,047, issued on May 29, 2007, which is also a divisional application of U.S. application Ser. No. 10/406,813 filed on Apr. 3, 2003, now patented as U.S. Pat. No. 7,207,742, issued on Apr. 24, 2007.

FIELD OF THE INVENTION

The present invention relates to safety improvements for airport taxiways and runways and particularly to the need to increase the width of taxiways and runways at airports in order to minimize the risk of foreign object damage to aircraft engines, as well as the safety issues regarding the deterioration of the existing natural grass surfaces bounding taxiways and runways.

BACKGROUND OF THE INVENTION

With the advent of larger and more powerful planes circulating on airport runways and taxiways that were constructed many years ago, there is a serious safety concern regarding overhanging engines which now frequently extend well beyond the existing runway and taxiway shoulders. The new generation of aircraft presently being manufactured have very large wing spans resulting in the jet engines overlapping the existing runway and taxiway shoulders, and in many cases actually hanging over the natural grass areas bounding the runway or taxiway, thus greatly increasing the risk of damage to aircraft engines by the presence of foreign objects.

The majority of airport runway and taxiway shoulders are constructed of asphalt which may have deteriorated surfaces and edges, such as cracking and spalling. This creates a serious risk of damage to aircraft and particularly aircraft engines overhanging the airstrip shoulders caused by foreign objects such as loose pieces of asphalt and debris that could be ingested by the aircraft engines. Foreign object damage is a primary safety concern for both airport operators and aircraft manufacturers since it could have catastrophic results. In addition to foreign object damage potential, asphalt pavements require periodic maintenance and/or complete replacement which adds to the overall airport operation costs.

In order to minimize the risk of foreign object damage to aircraft engines and in order to comply with regulatory safety issues, one solution is to increase the width of existing runways and taxiways using concrete or asphalt placed over deep bases in traditional construction methods. However, the costs related to traditional construction methods and to airport operation down-time resulting from the traditional construction are very significant and in some cases not feasible.

Air fields are generally constructed in large open areas and so in addition to jet blasts and vortex shedding, they are exposed to wind storms, ice and snow storms as well as sand storms, which requires expensive maintenance of existing topsoil bounding the runways and taxiways, such as cutting, grooming, cleaning, etc., in order to ensure efficient surface drainage of water, and to avoid water ponding and possibly freezing of the surface water on the runway.

Therefore, there is a need for improvement of airport runways and taxiways, particularly the need for improvements of the extension of existing runway and taxiway shoulders.

SUMMARY OF THE INVENTION

An object of the present invention is to provide a method for improving safety of airport runways and taxiways.

Another object of the present invention is to provide a cost-effective solution for the extension of existing runway and taxiway shoulders at airports in order to minimize the risk of foreign object damage to aircraft engines.

A further object of the present invention is to provide an airport runway and taxiway shoulder-bordering surface arrangement to extend the width of existing runway and taxiway shoulders, thereby reducing the potential for damage to aircraft engines by foreign objects.

In accordance with a general aspect of the present invention, there is provided a method for improving safety of airport airstrips comprising steps of:

a) providing a flexible surfacing material; and b) extending the width of an existing shoulder of the airstrip by installing said flexible surfacing material along a side of said airstrip.

In accordance with a more specific aspect of the present invention, the method comprises the steps of: providing a compacted soil base bounding a shoulder of an airstrip; placing a flexible, water-impermeable surfacing material on the compacted soil base; and anchoring the surfacing material to the airstrip in a water-tight manner so that the surfacing material will assure efficient surface drainage of water and allow for unobstructed run-off of loose particles.

It is preferable to further lay a synthetic grass surface on an area beyond the surfacing material so that loose particles can be trapped thereby when being driven by jet blasts from the airstrip and running off the surfacing material.

In accordance with another aspect of the present invention, an airport runway and taxiway shoulder-bordering surface arrangement is provided to extend the width of existing runway and taxiway shoulders, thereby eliminating the potential for damage to aircraft engines by loose particles. The arrangement comprises a compacted soil base bounding an airstrip and a flexible water-impermeable surfacing material placed on the compacted soil base and directly adjacent to a side edge of the airstrip. Means are provided for anchoring the surfacing material to the edge of the airstrip in a water-tight manner so that the surfacing material will assure efficient surface drainage of water and allow for unobstructed run-off of loose particles. It is noted that the flexible water-proof surfacing material can be installed directly on the existing paved airstrip shoulder area in order to reduce the cost of excavating the existing asphalt and to keep the existing shoulder in place.

In accordance with a further general aspect of the present invention, there is provided an airfield safety arrangement for reducing the risk that an aircraft engine be damaged as a result of the ingestion of foreign objects from an area adjacent an airstrip, the safety arrangement comprising a ground surfacing material adapted to be laid down on the ground so as to extend laterally outwardly from an airstrip, the ground surfacing material having a relatively smooth shedding surface sloping downwardly from the airstrip to provide for surface water drainage and run-off of loose particles to a location wherein the particles are not subject of being ingested by the engines of the aircrafts on the airstrip, and an edge anchoring system for bonding the ground surfacing material in a water-tight manner to the airstrip. The surfacing material may be provided with a textured pattern as long as it does not impede run-off of loose particles.

Still in accordance with the present invention, there is provided an airstrip shoulder-bordering surface arrangement for extending the width of existing runway and taxiway shoulders in order to reduce the potential for damage to aircraft engines by foreign objects (FOD), the arrangement comprising a flexible water-impermeable surfacing material adapted to extend laterally of a side edge of an airstrip shoulder; and an edge-fastening system for securing the surfacing material in position relative to the airstrip shoulder and prevent water migration therebetween, the surfacing material having a relatively smooth top surface to provide for water surface drainage and unobstructed run-off of loose particles.

The surfacing material preferably further includes reflective and luminescent materials (for instance phosphorescent materials) to provide perimeter lines and runway identification markings so that in situations where the luminescent effect of the reflective materials has faded the aircraft lights would be reflected. The reflective or luminescent materials can be provided as an integral part of the surfacing material or can be applied thereon such as by bonding, painting or other by using any other appropriate techniques. The surfacing material is preferably in a green colour, or could be other colours if required to make a strong visual contrast between the runway and taxiway edges and the edge of the natural field.

In another embodiment of the present invention, the arrangement further includes a synthetic grass surface covering an area beyond the surfacing material which is permanently bonded to the surfacing material. Thus, the relatively smooth texture of the surfacing material will allow for unobstructed run-off of any loose particles that might be present on the runway and taxiway shoulders and could present a potential for foreign object damage to aircraft engines. As an added value, the replacement of natural grass surfaces with the surfacing material in combination with the synthetic grass surface can provide considerable cost benefits with regards to airport maintenance budgets. This artificial grass can be either permeable or impermeable depending on the specifications for the specific application.

Substantial savings in airport maintenance budgets can be achieved with the installation of the surfacing material which is virtually maintenance free. In addition, the installation of the synthetic grass surface would eliminate the need for the trimming and cutting of natural grasses. The artificial grass would retain its permanent green colour and texture throughout the year, thus eliminating the need to re-sod old and dead natural grass. In hot and arid climates, for example, in the Middle East, the relatively smooth shedding surface of the surfacing material would allow the removal of sand and other loose foreign objects quickly and efficiently from the shoulders simply as a result of the wind or air turbulence created by aircrafts or other mechanical means. Regular maintenance to keep the extended shoulders free of hazardous debris can be conducted easily, quickly and economically. The debris is displaced into the adjacent synthetic grass turf where the debris will be trapped. If necessary the accumulated debris can be vacuumed out periodically.

In cold climates accumulated snow can be easily and quickly removed from the surfacing material either by large blowers or sweepers, to a distance beyond the overhang of aircraft engines.

Since the surfacing material is completely water-tight, the risk of settlement and deterioration of the supporting base would be eliminated, thus providing a stable base for maintenance vehicle circulation year-round.

The pattern of installation of the surfacing material with the seams running parallel to the existing shoulder edges would not interfere with maintenance operations.

Other advantages and features of the present invention will be better understood with reference to preferred embodiments thereof described hereinafter.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a perspective view of an airport runway having shoulder extensions in accordance with a preferred embodiment of the present invention;

FIG. 2 is a cross-sectional view of an airstrip shoulder-bordering arrangement in accordance with a first embodiment of the present invention; and FIG. 3 is a cross-sectional view of an airstrip shoulder-bordering arrangement in accordance with a second embodiment of the present invention.

DETAILED DESCRIPTION OF THE PREFERRED EMBODIMENT

FIG. 1 illustrates an airport runway 10 comprising a central take-off/landing strip 11 and a pair of runway shoulders 12. Each shoulder 12 is extended laterally outwardly by means of a shoulder-bordering arrangement comprising a soft ground cover or flexible water-proof surfacing material 14.

As shown in FIG. 2, the installation of the surfacing material 14 normally begins with a first step of removing the existing organic material contained in the uppermost stratum of the ground G bounding the shoulders 12 of the runway or taxiway which is generally referred to as an airstrip throughout this application, to a depth dictated by the soil report. The ground G is excavated down to a compactable earth surface. At that point, the soil is graded and compacted by being rolled and shaped to meet the required slopes such that the flow of surface water will be controlled to drain to specific locations. The rocks are removed from the compacted soil base and if required, a layer of engineered backfill will be installed and compacted prior to installing the surfacing material 14 directly on the compacted backfill if specified to do so. It is noted that in some applications, the surfacing material 14 may be laid down directly on the ground without the need for excavating.

The flexible surfacing material 14, which is a plastic composite, for example polypropylene, urethane, vinyl or polyethylene, is laid directly on the compacted soil base adjacent to the edge of the existing airstrip shoulder 12. As shown in FIG. 3, the surfacing material 14 may also be installed so as to at least partly cover or overlap the shoulder 12 of the airstrip (i.e. the runway or the taxiway). This is particularly applicable in the case where the existing shoulder would have to be repaired or re-paved. The surfacing material 14 has a relatively smooth texture having a thickness of between 50 mm and 400 mm. The surfacing material 14 can be provided in the form of a polyethylene, polypropylene or any other type of plastic or composite material that can be sprayed or laminated upon a mesh substrate. The polyethylene or any equivalent thereof could be sprayed or applied by various methods on site or at the manufacturing plant. The surfacing material 14 is completely water-impermeable and is preferably permanently bonded to an edge-fastening system or anchoring system 16 placed next to the existing airstrip shoulder edges or to the shoulder 12 directly since all installations are different.

The installation of the surfacing material 14 is completed by overlapping rolls of the surfacing material and applying a heat treatment, such as thermal welding, or by applying adhesives to the overlapping surfacing materials, thus fusing the two materials together to obtain a permanent, water-tight and strong bonding of the seams.

In the illustrated embodiment, the surfacing material 14 is bonded in a water-tight manner to the airstrip shoulder 12. More particularly, the interface between the edge of the existing airstrip shoulders and the first roll of the surfacing material can be made water-tight by installing impermeable elastomeric sealers in order to assure a continuous and uninterrupted surface drainage of the impermeable surface. The impermeable elastomeric sealer is incorporated with the specially designed anchoring system 16 which assures the safe, permanent and economical anchoring of the edges of the surfacing material 14 to the immediately adjacent existing airstrip shoulders 12.

The anchoring system 16 preferably includes a prefabricated, extruded plastic member 18, for example polypropylene or other plastic that can be thermally bonded to the flexible surfacing material 14. The extruded plastic member 18 is partially embedded in specially formulated expanding foam 20 which is injected into a narrow excavated trench along the edge of the airstrip shoulder 12. The excavation, injection of foam, and bonding of the plastic member 18 are completed simultaneously in one operation. The plastic member 18 has an anchoring portion 24 from which extends a leg 26 supporting an above-ground section or head 22 to which the first row of surfacing material 14 is thermally or mechanically bonded. For instance, bonding of the surfacing material 14 can be done by applying a heat activated treatment or by applying adhesives to the overlapping of the surfacing material 14 and the extruded plastic member 18, thus permanently fusing the two materials together. This anchoring system 16 provides a water-tight seal between the airstrip shoulder edge and the surfacing material 14. A sealer 27 is preferably provided along the vertical interface between the shoulder 12 and the ground surfacing arrangement, as shown in FIG. 2.

When the entire surfacing material 14 is in place, the surfacing material 14 will take the shape and the slope of the underlying compacted soil base and will stay flat to provide the relatively smooth shedding surface to provide for water drainage and run off of loose particles. The extent in width and length to which the surfacing material 14 is installed will depend on the performance and design criteria of the specific sites. The areas beyond the surfacing material 14 could be covered with artificial grass 30 which would trap any born particles, such as sand displace by aircraft. The synthetic grass surface is permanently bonded to the surfacing material 14 such as by applying the thermal welding technique or by applying adhesives to assure a permanent water-tight seam between the surfacing material 14 and the synthetic grass surface 30.

The synthetic grass surface 30 generally includes a pile fabric 32 which is preferably placed over a compacted soil base substantially free of organic matter. The pile fabric 32 includes a plurality of pile elements 34 resembling blades of grass and extending from a relatively thin and flexible backing mat 36 to a predetermined height thereabove. A non-water retaining ballast material 38 for stabilizing the pile fabric 32 in place is provided on the backing mat 36 and has a thickness less than the predetermined height of the pile elements 34. The ballast material 38 is provided in the form of a relatively thick layer of particulate material dispersed among the pile elements 34 on the backing mat 36. The synthetic grass is typically installed on a sloped base for directing water from the pile fabric 32 to the designed storm water management system. Surface drainage is important since it is easier to prepare and can work at lower cost.

The rows of pile elements 34 can be similar to that described in Applicant's co-pending Canadian Patent 2,218, 314 filed on Oct. 16, 1997, and laid open on Sep. 10, 1998, the contents of which are incorporated herein by reference.

A thin impermeable membrane 40 is laid on the compacted soil base to prevent water from percolating down thereto. A drainage enabling layer 42 which comprises a thick layer of aggregate, such as rock particulates, is provided on the impermeable membrane 40. The flexible baking mat 36 is placed on the drainage enabling layer 42 so that the water can readily flow from the backing mat 36 through the drainage enabling layer 42 onto the impermeable membrane 40 and into storm sewers placed at strategic locations. This embodiment is described with more details in Applicant's PCT application PCT/CA01/01275, entitled ARTIFICIAL GRASS FOR LANDSCAPING, filed Sep. 5, 2001, the specifications of which is incorporated herein by reference. It is noted that the water barrier could be integrated to the backing mat 36 in which case the infill layer 38 would act as the drainage enabling layer.

As shown in FIG. 2, the surfacing material 14 can be bonded to the edge of the impermeable membrane 40 to provide a water-tight seal between the synthetic grass surface 30 and the surfacing material 14. Alternatively, the surfacing material could be placed underneath the backing mat 36 and be thermally or adhesively bonded thereto.

As an added safety feature, the surfacing material 14 can be fabricated with a permanent colour such as green, or with other colours if required to enhance visual contrast between the central landing zone of the airstrip 10 and the shoulders 12 thereof. The surfacing material 14 can also be designed to accept solar energy absorbing fabrics which will dissipate a luminescent glow during the night without the need of outside power sources. The luminescent reflective glow would last up to 10-12 hours to cover the dusk to dawn period. The solar absorbing fabric can be coated directly onto the installed surfacing material 14 or can be installed during fabrication. Patterns spacing and shape factors can be custom fabricated to meet specific airport operation specifications. The solar absorbing fabric can advantageously replace conventional lighting systems for small airports.

The surfacing material 14 can further include special reflective fabrics installed thereon to enhance the visibility of the runway path for aircraft landing during the night. Thus in situations where the luminescent effect of the solar absorbing fabric fades, the aircraft lights will be reflected by the one-way reflective fabrics to facilitate safe landing.

As shown in FIG. 3, the surfacing material 14 can be installed directly on an existing shoulder 12 and anchored thereto by means of an anchor member 18' provided in the form of a plastic extrusion placed in a trench formed in the shoulder 12 and fixed in position therein by means of a plurality of anchoring bars. The surfacing material 14 can be thermally or adhesively bonded to the anchor member 18' or even mechanically attached thereto, as described hereinbefore with respect to FIG. 2. Alternatively, the surfacing material 14 could be adhesively bonded directly to the shoulder 12. A given thickness of material is removed from the shoulders 12 so that the surfacing material 14 is substantially flush with the take-off/landing strip 11.

Protection against foreign object damage (FOD) can be further enhanced by incorporating a guidance system into the surfacing material for guiding a robot 48 parallel the runway 10 in order to locate and detect FOD materials that could be ingested by the aircraft engines. The guidance system could include a magnetic guidance wire 46 embedded in the surfacing material 14 or any other type of guidance technology.

By having guidance wires embedded into the flexible surfacing material 14, drainage of the runway would not be impeded by channels or protruding edges to guide the robots 48. The robots 48 could also be designed to clear the flexible fabric of sand and FOD by means of having a larger robot made with the necessary blowers to do so. The FOD detecting robot would need to be heavy and stable enough to not be displaced from the wind and or jet wash. A cable system could also be used to guide the robot along and keep the robot tethered.

Modifications and improvements to the above-described embodiment of the present invention may become apparent to those skilled in the art. The foregoing description is intended to be exemplary rather than limiting. The scope of the invention is therefore intended to be limited solely by the scope of the appended claims.

What is claimed is:

1. An edge-fastening system for securing an airfield safety arrangement surfacing material in position relative to an airstrip shoulder, the edge fastening system comprising:
    an anchor adjacent the side edge of the airstrip shoulder, said anchor having a head with an above-ground portion disposed beneath a surfacing material and bonded to an edge of said surfacing material; and
    wherein said anchor and said shoulder form a fluid-tight seal.

2. The edge-fastening system according to claim 1, wherein said anchor is at least partially embedded in expansion foam.

3. The edge-fastening system according to claim 1, further comprising a sealer between the anchor and the airstrip shoulder.

4. An airstrip shoulder-bordering surface arrangement as defined in claim 1, wherein said above-ground portion and said edge of said surfacing material include a thermal bond.

5. An airstrip shoulder-bordering surface arrangement as defined in claim 4, wherein said thermal bond includes heat-activated treatment.

6. An airstrip shoulder-bordering surface arrangement as defined in claim 1, wherein said above-ground portion and said edge of said surfacing material include a mechanical bond.

7. An airstrip shoulder-bordering surface arrangement as defined in claim 6, wherein said mechanical bond is an adhesive.

8. The edge-fastening system according to claim 1, wherein said anchor is provided in the form of an extrusion having a bottom anchoring portion connected to said head via an upstanding leg portion.

9. The edge-fastening system according to claim 1, wherein said anchor is plastic.

10. The edge-fastening system according to claim 8, wherein said extrusion is plastic.

11. An edge-fastening system for securing an airfield safety arrangement surfacing material in position relative to an airstrip shoulder, the edge fastening system comprising:
    an anchor in the form of an extrusion adjacent the side edge of the airstrip shoulder, said anchor having:
        a head with an above-ground portion disposed beneath a surfacing material and bonded to an edge of said surfacing material; and
        a bottom anchoring portion connected to said head; and
        wherein said anchor and said shoulder form a fluid-tight seal; and
    a sealer between the anchor and the airstrip shoulder.

12. An airstrip shoulder-bordering surface arrangement as defined in claim 11, wherein said above-ground portion and said edge of said surfacing material include a thermal bond.

13. An airstrip shoulder-bordering surface arrangement as defined in claim 11, wherein said above-ground portion and said edge of said surfacing material include a mechanical bond.

14. The edge-fastening system according to claim 11, wherein said anchor is plastic.

15. The edge-fastening system according to claim 11, wherein said anchor has a bottom anchoring portion which is connected to said head via an upstanding leg portion.

16. An edge-fastening system for securing an airfield safety arrangement surfacing material in position relative to an airstrip shoulder, the edge fastening system comprising:
    an anchor in the form of a prefabricated plastic extrusion adjacent the side edge of the airstrip shoulder, said anchor having:
        a head with an above-ground portion disposed beneath a surfacing material and bonded to an edge of said surfacing material; and
        a bottom anchoring portion connected to said head via an upstanding leg portion; and
        wherein said anchor and said shoulder form a fluid-tight seal; and
        wherein said anchor is partially embedded in expansion foam; and
    further comprising a sealer between the anchor and the airstrip shoulder.

17. An airstrip shoulder-bordering surface arrangement as defined in claim 16, wherein said above-ground portion and said edge of said surfacing material include a thermal bond.

18. An airstrip shoulder-bordering surface arrangement as defined in claim 16, wherein said above-ground portion and said edge of said surfacing material include a mechanical bond.

* * * * *